(No Model.)

H. J. HERBERT.
UMBRELLA RUNNER RETAINER.

No. 486,778. Patented Nov. 22, 1892.

Witnesses:
Geo. H. Lothrop
Gertrude H. Anderson

Inventor
Henry J. Herbert

UNITED STATES PATENT OFFICE.

HENRY J. HERBERT, OF DETROIT, MICHIGAN.

UMBRELLA-RUNNER RETAINER.

SPECIFICATION forming part of Letters Patent No. 486,778, dated November 22, 1892.

Application filed March 7, 1892. Serial No. 424,042. (No model.)

*To all whom it may concern:*

Be it known that I, HENRY J. HERBERT, of Detroit, in the county of Wayne and State of Michigan, have invented a new and useful Improvement in Spring-Fasteners for Umbrella-Runners, of which the following is a specification.

My invention consists in an improved spring-fastener for umbrella-runners, hereinafter fully described and claimed.

Figure 3:
Figure 2:
Figure 1:
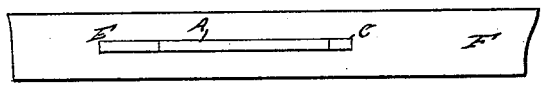

Figure 1 is a plan view of part of an umbrella-stick, showing the fastener in position. Fig. 2 is a cross-section of part of the stick, showing the fastener in elevation; and Fig. 3 is an elevation of the fastener.

My improved fastener is stamped out of a piece of sheet metal, usually brass, and is made in two parts.

E represents a pin formed on one end of the fastener, adapted to drive into the stick F and hold one end of the fastener in position.

J represents an arm extending from pin E, and I represents another arm extending over arm J and provided with a nose A. From the junction of the arms J and I a lug B extends, which fits into a groove D, formed in a pin C, also adapted to drive into the stick F, and makes a hinged joint between the two parts of the fastener.

F represents a part of an umbrella-stick, and H represents a saw-kerf cut therein with a circular saw, which is made so deep that when the fastener is in position, as shown in Fig. 2, the arm J is free from the bottom of the saw-kerf.

Spring-fasteners have before been stamped out of sheet metal, but have been so fastened that the spring, when the nose A is depressed, is practically all given by the part which carries the nose corresponding with arm I, and this requires that the part which corresponds to the arm I should be made quite thin and weak, and even then the fastener is subjected to heavy strain when the nose is depressed.

With my construction it will be seen that the arm I forms a lever by which when the nose A is depressed the greater part of the spring is caused in the long arm J, thus making the spring long and easy and relieving the fastener from undue strain. The joint formed by lug B and groove E permits sufficient motion at this point to allow for the spring of the fastener. The grooved pin C, in connection with the pin E, makes it unnecessary to secure the fastener to the stick by means of a pin passed through the stick and fastener, as is done with all other fasteners.

What I claim as my invention, and desire to secure by Letters Patent, is—

1. A spring-fastener consisting of a piece of sheet metal having a pin at one end, an upper and lower spring-arm, the upper arm carrying a nose at its end nearest the fastening-pin, and a loose connection with the stick at the joint of the two arms to permit the motion of both spring-arms, substantially as shown and described.

2. An umbrella-fastener consisting of a pin E, arms J and I, the arm I carrying nose A, a lug B at the junction of said arms J and I, and a pin C, having a groove to receive lug B, substantially as shown and described.

HENRY J. HERBERT.

Witnesses:
  GEO. H. LOTHROP,
  GERTRUDE H. ANDERSON.